R. P. AKINS.
ROTARY FILTER.
APPLICATION FILED JAN. 20, 1911.

1,059,327.

Patented Apr. 15, 1913.

6 SHEETS—SHEET 1.

WITNESSES:

INVENTOR:
Randall P. Akins,
BY
ATTORNEYS.

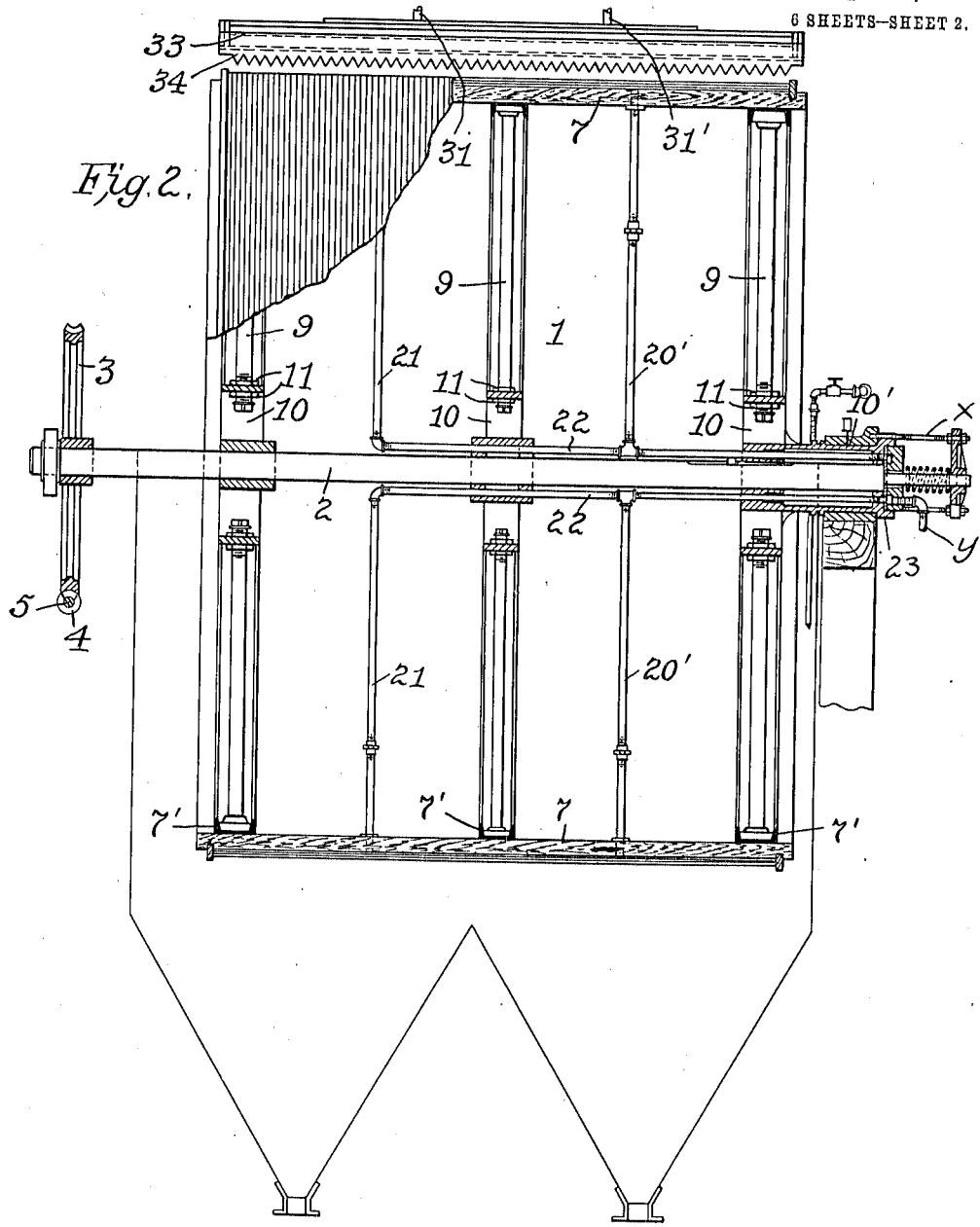

R. P. AKINS.
ROTARY FILTER.
APPLICATION FILED JAN. 20, 1911.
1,059,327.
Patented Apr. 15, 1913.
6 SHEETS—SHEET 3.
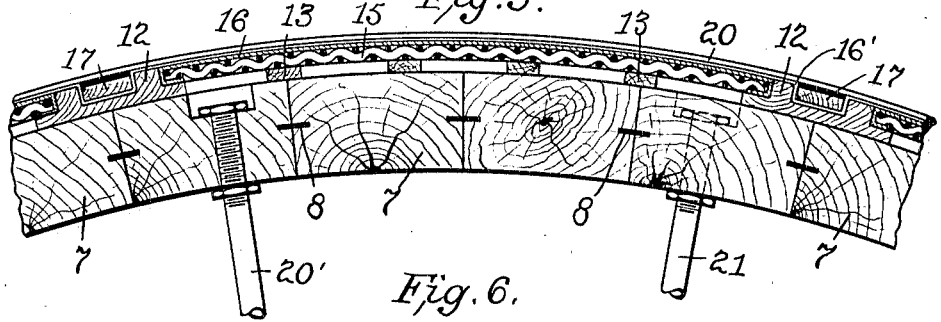
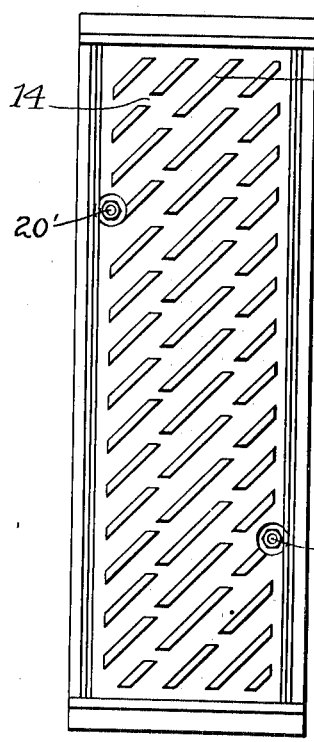
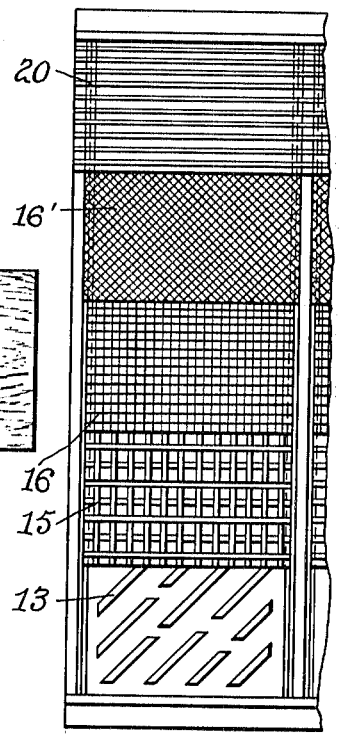
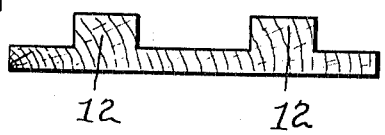
WITNESSES:
INVENTOR:
Randall P. Akins,
BY
ATTORNEYS.

R. P. AKINS.
ROTARY FILTER.
APPLICATION FILED JAN. 20, 1911.
1,059,327.
Patented Apr. 15, 1913.
6 SHEETS—SHEET 5.
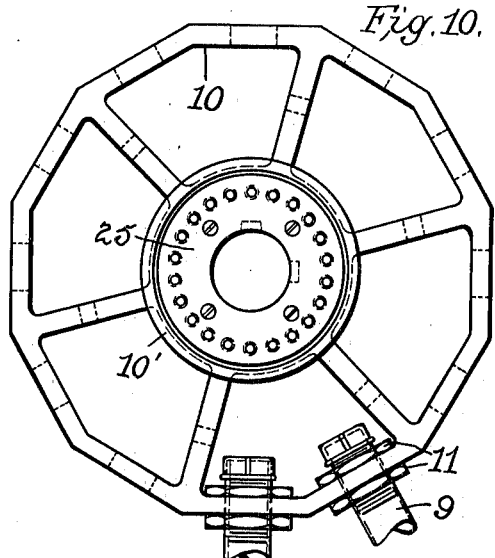
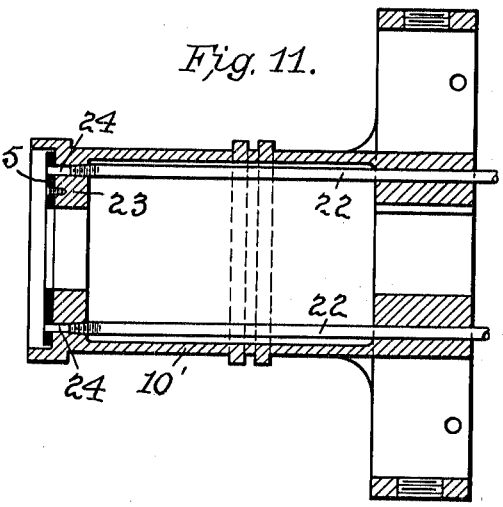
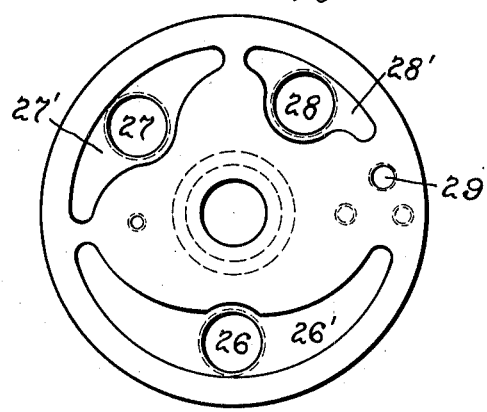
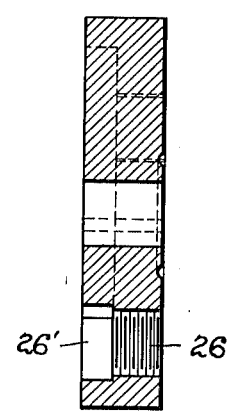
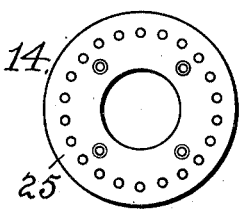
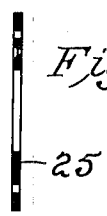
WITNESSES:
Ewd L. Tolson
Edward N. Sauter
INVENTOR.
Randall P. Akins,
BY Spear Middleton Donaldson & Spear
ATTORNEYS.

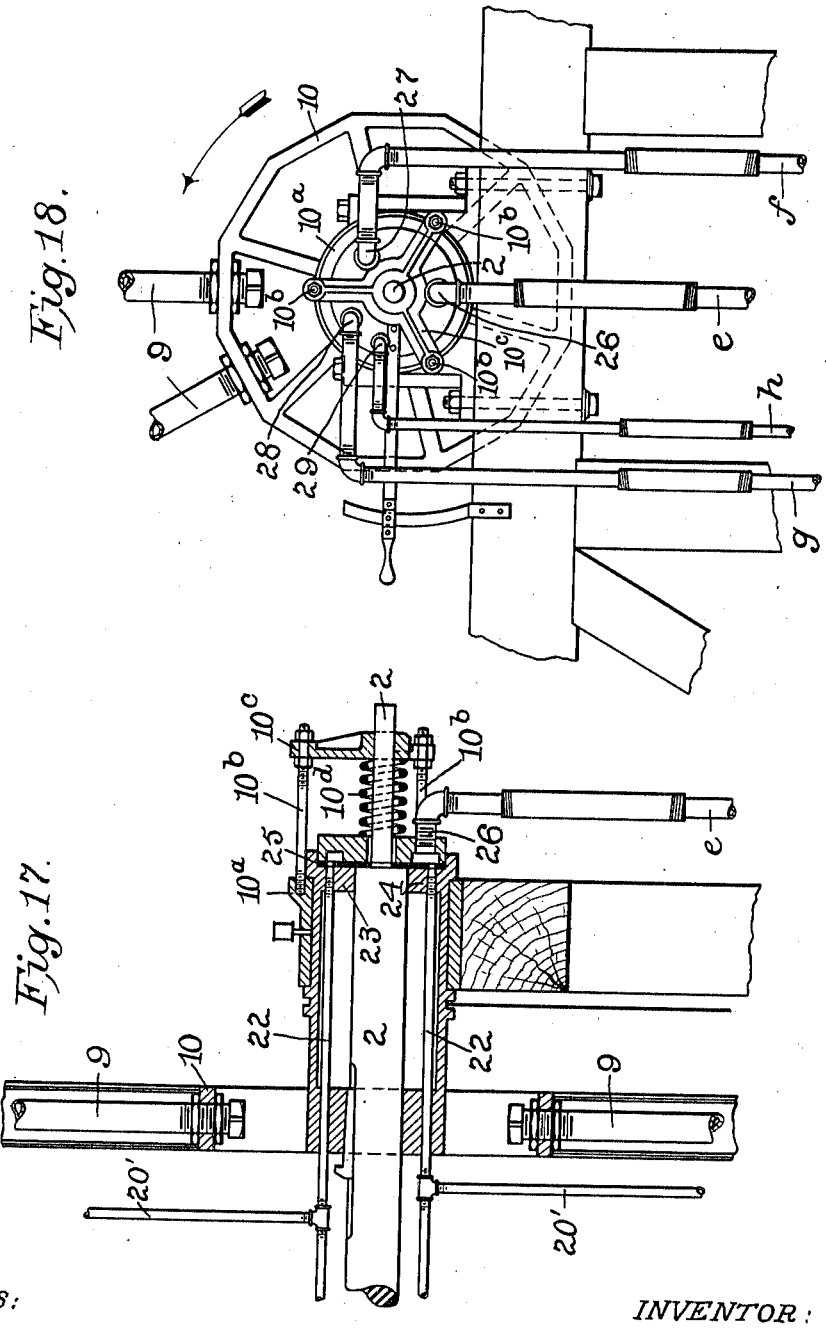

UNITED STATES PATENT OFFICE.

RANDALL P. AKINS, OF DENVER, COLORADO, ASSIGNOR TO COLORADO IRON WORKS CO., OF DENVER, COLORADO.

ROTARY FILTER.

1,059,327.  Specification of Letters Patent.   Patented Apr. 15, 1913.

Application filed January 20, 1911. Serial No. 603,734. REISSUED

*To all whom it may concern:*

Be it known that I, RANDALL P. AKINS, a citizen of the United States, residing at Denver, Colorado, have invented certain new and useful Improvements in Rotary Filters, of which the following is a specification.

My invention relates to that type of revoluble filters for the treatment of ore and liquids in which a rotary carrier has thereon a number of filter pans which are carried in the revolution of the carrier into and out of the tank, the filter pans being subjected to suction pressure as they are passing through the tank, and being subjected to air pressure at or near the point of discharge for assisting in the removal of the material collected from the tank, and the invention consists in the features of construction and combination and arrangement of parts hereinafter described and particularly pointed out in the appended claims.

Figure 1:
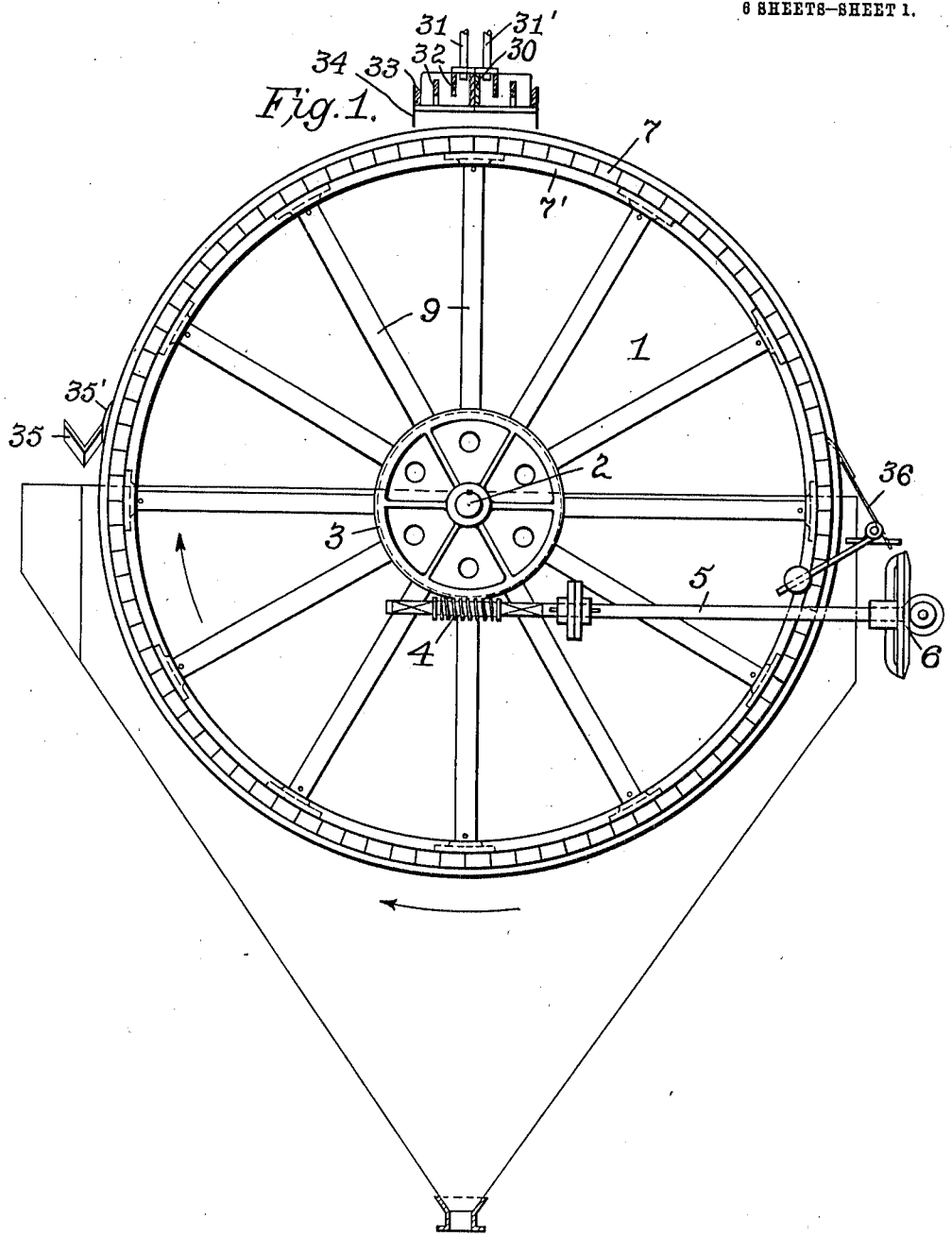
Figure 9:
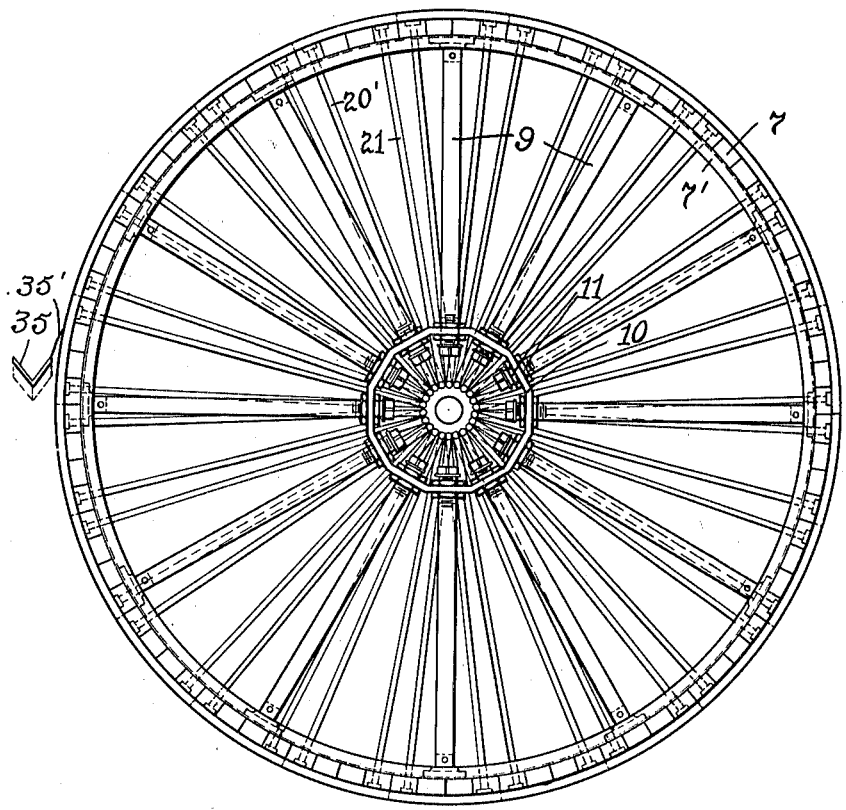
Figure 16:
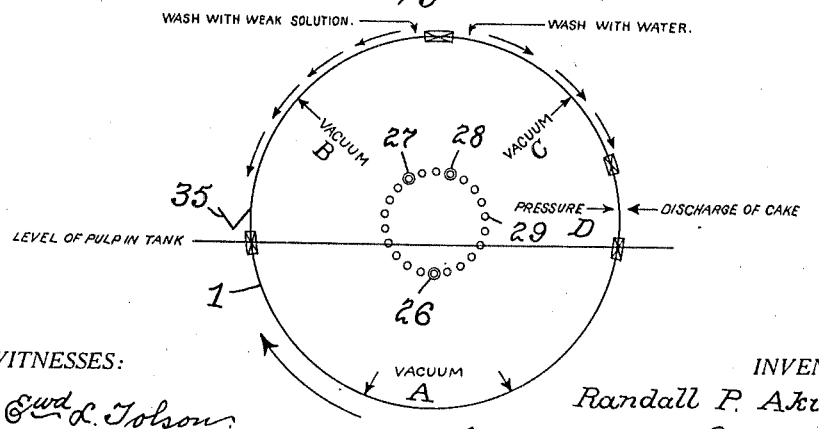

In the accompanying drawings Figure 1 is an elevation of a carrier partly immersed in a tank and embodying features of the invention, this view being in the nature of a diagram, and of parts in section, the view being taken from the driven end of the carrier. Fig. 2 is a sectional view of the carrier along its axis, a portion being shown in elevation. Fig. 3 is an enlarged sectional view of a portion of the carrier rim showing one of the filter compartments or pans. Fig. 4 is a plan view of a portion of the periphery of the carrier, this view embracing the area of said periphery, constituting one of the filter compartments, the filtering media being omitted. Fig. 5 is a view similar to Fig. 4 of a portion of the periphery of the carrier, this view being in the nature of a diagram to show the different layers of material covering the surface of the carrier or the compartment at this point. Fig. 6 shows in section a batten with a metallic plate and the screw for securing these parts to the carrier for holding a portion of the filtering media and for the attachment of the securing wires or metal bands. Fig. 7 is a view of the end portion of one of the wooden strips of which the periphery of the carrier is made up, and showing in section the filtering media and how the same is held near the ends of the said wooden strips, or at the edges of the peripheral surface of the carrier; Fig. 8 is a view of one of the wooden strips which divide the surface of the carrier into the compartments or filtering pans. Fig. 9 is a side view of the carrier with the various pipe connections leading to the filter pans. Fig. 10 is a side view of the spider looking from the right of Fig. 2, with one of the valve members. Fig. 11 is a sectional view of Fig. 10. Fig. 12 is an inside face view of the stationary valve member. Fig. 13 is a sectional view of Fig. 12. Fig. 14 is a face view of the valve member wear plate carried by the hub of the spider. Fig. 15 is a sectional view of Fig. 14. Fig. 16 is a diagrammatic view of the carrier, tank and valve members. Fig. 17 and 18 are detail views.

The carrier 1 is mounted upon an axle 2 which is driven by a worm wheel 3 and a worm 4, the latter being on a shaft 5 driven in any suitable manner by gearing at 6, Fig. 1. The carrier comprises a rim or cylinder made up of a number of strips of wood, 7, Fig. 3, preferably doweled together, as at 8, these strips being supported by bearing rims 7' preferably of metal, three of these being shown in Fig. 2, one at each end of the carrier and one at the center, these bearing rims being, in turn, carried by spokes 9, the inner threaded ends of which are attached to the spider casting or hub 10 by the nuts 11, Figs. 2, 9 and 10. This drum or cylinder carries a number of division strips 12 extending parallel with the axis and projecting from the surface of the wooden strips 7, these strips 12 forming the division walls between the filter sections or compartments, as shown in Fig. 3. Between these division strips short lower strips 13 are fixed to the surface of the drum, and spaced apart, as shown in Fig. 4, having also spaces 14 between their ends, and these lower strips are arranged inclined in respect to the direction of revolution of the carrier. They divide up the surface of the filter compartment or pan forming circuitous passages along the said surface, and upon these low strips the filtering media are arranged consisting of a wire screen or cloth 15 of coarse mesh over which is placed a layer of burlap 16 having its edges turned under the edges of the wire cloth, and over this burlap there is a canvas layer 16' which extends also over the division strips wherein the canvas is held by battens 17, consisting of strips of wood to fit the grooves, said strips being faced by metal strips 18, and these two strips being secured in place by screws, as at 19, Fig. 6. Outside of these layers of filtering material a layer of wire 20 is arranged, and this may consist of a continuous strand of wire wound circumferentially around the drum or carrier, and the strands of this wire may be placed a slight distance apart, as shown in Fig. 5. This outer covering of wire is soldered to the thin metal strips 18 to retain the wire covering in position and to prevent the wire from unwinding in case of breakage of the same at any point. The function of this wire is to hold the filtering media in position on the carrier or sections. This covering wire need not, however, be in the form of a continuous wire running around the drum, but may be broken at the point of soldering to the metal strip on the batten. In applying this covering wire, it may be wound continuously and then broken at the point of soldering to the metal portion of the batten. Pipes 20' and 21 connect with the filter compartments or pans at different points, as shown in Figs. 2 and 4, and also in Fig. 9, and these pipes extend toward the center of the carrier and connect with pipes 22 which extend along the shaft through the hub 10' of the spider 10, being screw threaded into the end wall 23 of said hub, and thus communicating with ports 24 extending through the wall 23 and with ports in a plate 25 screwed within the recess at the outer end of the hub of the spider, this plate 25 constituting a wear plate which may be replaced when worn. This plate 25, together with the end wall of the hub of the spider at 23, form, in effect, one member of a controlling valve, that is, the movable member. It will be understood, however, that I do not limit myself to the details of construction just described, as this movable valve member may be otherwise constructed. Within the recess at the end of the hub of the spider, I arrange a stationary valve member consisting of the plate shown in Figs. 12 and 13. This stationary valve member or plate has a port 26 connected with a recess 26' and ports 27 and 28 connected with recesses 27' and 28' formed in the face of the plate, and also a port 29. Suitable pipe connections lead to these ports and are connected therewith by screw threads indicated in Fig. 13, the pipes connected with the ports 26, 27 and 28 extending to suction means, while the pipe of the port 29 connects with air pressure means. In Fig. 16, which is a diagram of the apparatus, these ports are indicated, and the circle indicates the carrier moving in the direction of the arrow. This carrier is submerged in the bath of the tank, and the points where the pans or filter compartments on the carrier are subjected to the suction or vacuum pressure are indicated at A, B, and C. At A the suction is derived through the port 26 when the ports in the rotating member of the valve, i. e., the ported portion of the hub of the spider or the wear plate 25 registers with the port 26 or with the recess 26' connected with the said port and extending to each side of the same. The submerged filter pan will therefore be collecting the material from the tank, while the solution will be drawn through the forming cake, and this being rich in gold, will be delivered to the precipitation plant for the extraction of the gold through the pipe connected with the port 26.

At the top of the carrier a trough for the supply of wash water and weak solution is supported, this trough, as shown in Fig. 1, being of double form and consisting of a portion on each side of the central partition 30. To the left hand compartment of this trough a pipe 31 leads to supply weak solution which passes under the baffle plates 32 and over a weir 33 onto a vertical plate 34 having a serrated edge depending below the main portion of the trough so that the weak solution will run down this plate and will be delivered from the points thereof onto the surface of the carrier from side to side of the same. This weak solution will flow in a film down the rising side of the carrier in the direction of the arrows, in Fig. 16. This film of barren solution, therefore, flows downward over the rising filter pans, and when one of these pans or compartments with the cake of collected material thereon reaches the point B, it is subjected to the suction while the film of barren solution is flowing downward over this pan. The amount of this solution or wash is so regulated that it is nearly all drawn through the cake and filter pan, and any surplus that may escape downwardly along the surface of the carrier will be caught in a trough 35, and this will be delivered separately from any other solution, it being too low in value for the precipitation of gold therefrom. It may be used, however, for the treatment of fresh ore, going with it later into the main filter tank. To the other side of the upper trough a pipe 31' extends, and through this wash water is delivered to the trough which runs down over the serrated side plate and is delivered to the surface of the carrier, and flows thence downwardly over the descending side of the said carrier, the purpose of this wash water being to displace the cyanide solution retained as moisture in the cake, and this wash water, when the filter pan reaches the point C, will be subjected to the suction through the port 28, and will be delivered through the pipe connected with said port and kept separate from the weak solution which is delivered through the port 27. When the rotation of the carrier brings the filter pan into communication with the port 29, in the stationary valve member, this communication taking place through the pipes 20', 21 and 22 above described, air pressure will be admitted to the filter pan through these pipes, and the cake of collected material will be blown off, leaving the filter carrier clean before entering the tank again. A scraper 36 is employed to assist in this dislodgment of the cake, and clearing of the filter pans. The trough 35 is provided with a flexible member 35' connected with its edge and bearing upon the surface of the carrier, this flexible portion being, for instance, of rubber, thus forming a seal between the trough and the surface of the carrier which will insure the excess weak solution being directed into the trough for separate delivery.

It will be observed that a single set of pipes are employed, being used at one time for the suction operation and at another time for the air pressure delivery. It will be seen also that a single row of openings or ports are employed in the movable valve member, and that these ports are brought in succession to the several ports in the stationary valve member, and that this stationary valve member has a series of suction ports for the delivery of the material passing therethrough to separate points for different uses or treatments. In other words, there is no mixing of the solutions flowing through the different ports in the stationary valve member, but these solutions are kept separate and delivered separately.

As shown in Fig. 7, the filter pans at the edges of the carrier are bounded by batten strips 37 secured by screws in grooves in the surface of the carrier, and these battens hold the filter material.

Referring to Fig. 17, 10$^a$ is the trunnion bearing, 10$^b$ studs, 10$^c$ a frame or spider held by the studs, 10$^d$ a spring for holding the valve plate against the rotating plate of the trunnion.

Fig. 18 shows pipe $e$ for filtrate from opening 26, and recess 26', $f$ is the conduit for wash solution from opening 27 and recess 27'; $g$ is the conduit for wash water from opening 28 and recess 28', and $h$ is the air conduit leading to opening 29.

I claim as my invention:—

1. A machine for separating liquids from materials and washing said materials, comprising an endless carrier with filter sections, means for moving said carrier, stationary means for applying the material to said filter sections, means for applying a washing medium to the material and means for separating the filtrates which respectively pass through the filtering means before reaching the point of application of the washing medium and after passing said point.

2. In combination a bath, a carrier having filter pans, means for discharging liquid onto the carrier, suction connections, and a trough to receive the excess liquid from the surface of the carrier, said trough being on the rising side of the carrier and having a flexible portion bearing thereon, substantially as described.

3. In combination a bath, a carrier having filter compartments or pans with filtering material, and wire extending circumferentially of the carrier and over the pans, said wire being secured at different points about the periphery of the carrier, substantially as described.

4. In combination a bath, a carrier having filter compartments or pans with filtering material, a metallic member or members extending across the surface of the carrier, and wire extending circumferentially of the carrier and over the pans, said wire being soldered to the metallic member or members, substantially as described.

5. In combination a bath, a carrier having filter compartments or pans with filtering material, a metallic member or members extending across the surface of the carrier and a continuous wire extending circumferentially about the carrier over the filtering material and soldered to the cross metallic member, substantially as described.

6. In combination a bath, a carrier having filter compartments with filtering material, metal bands extending across the carrier from side to side, and wire extending circumferentially about the carrier and broken at and soldered to the metallic bands, substantially as described.

7. In combination the carrier having projecting division strips thereon with recesses in their outer faces, filter material extending over the division strips and battens fitted to the said recesses for holding the filter material therein, substantially as described.

8. A machine for separating liquids from materials and for washing and saturating materials with liquids comprising a cylindrical filtering surface, means for rotating said surface, stationary means for applying the material to said surface, stationary means spaced from said applying means, for applying a washing medium to the material, and means for separating the filtrates which respectively pass through the filtering means before reaching the point of application of the washing medium and after passing said point.

9. A machine for separating liquids from materials and for washing and saturating materials with liquids comprising a cylindrical filtering surface, means for exerting a suction within said surface, means for rotating said surface, stationary means for applying the material to said surface, stationary means, spaced from said applying means, for applying a washing medium to the material, and means for separating the filtrates which respectively pass through the filtering means before reaching the point of application of the washing medium and after passing said point.

10. A machine for separating liquids from materials and for washing and saturating materials with liquids comprising a cylindrical filtering surface, means for exerting a suction within said surface, means for rotating said surface, stationary means for applying the material to said surface, stationary means spaced from said applying means, for applying a washing medium to the material, means for separating the filtrates which respectively pass through the filtering means before reaching the point of application of the washing medium and after passing said point, and means for withdrawing the separated filtrates from the interior of the cylindrical surface during the operation of the machine.

In testimony whereof, I affix my signature in presence of two witnesses.

RANDALL P. AKINS.

Witnesses:
W. R. CADY,
JOHN E. ROTHWELL.